US010629126B2

(12) United States Patent
Wang et al.

(10) Patent No.: US 10,629,126 B2
(45) Date of Patent: Apr. 21, 2020

(54) METHOD FOR DRIVING A PIXEL CIRCUIT, DRIVE DEVICE AND DISPLAY DEVICE

(71) Applicant: BOE Technology Group Co., Ltd., Beijing (CN)

(72) Inventors: Lirong Wang, Beijing (CN); Quanhu Li, Beijing (CN); Fei Yang, Beijing (CN); Danna Song, Beijing (CN); Mingi Chu, Beijing (CN); Song Meng, Beijing (CN); Yu Wang, Beijing (CN); Yi Chen, Beijing (CN); Zhongyuan Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/043,977

(22) Filed: Jul. 24, 2018

(65) Prior Publication Data

US 2019/0206326 A1 Jul. 4, 2019

(30) Foreign Application Priority Data

Jan. 2, 2018 (CN) .......................... 2018 1 0002145

(51) Int. Cl.
*G09G 5/10* (2006.01)
*G06F 3/038* (2013.01)
(Continued)

(52) U.S. Cl.
CPC ......... *G09G 3/3258* (2013.01); *G09G 3/2003* (2013.01); *H05B 33/0857* (2013.01);
(Continued)

(58) Field of Classification Search
None
See application file for complete search history.

(56) References Cited

U.S. PATENT DOCUMENTS

2005/0270262 A1* 12/2005 Oh ....................... G09G 3/3611 345/89
2015/0130865 A1* 5/2015 Shim .................... G09G 3/3233 345/694
(Continued)

FOREIGN PATENT DOCUMENTS

CN 107103879 A 8/2017

OTHER PUBLICATIONS

SIPO, "First Office Action," issued in connection with Application No. 201810002145.3, dated May 7, 2019, 14 pages.

*Primary Examiner* — Nan-Ying Yang
(74) *Attorney, Agent, or Firm* — Arent Fox LLP; Michael Fainberg

(57) ABSTRACT

The disclosure discloses a method for driving a pixel circuit, a drive device and a display device. The method includes: receiving grayscale data to be displayed; determining a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit; and compensating the theoretical drive voltage corresponding to the grayscale data to be displayed with the determined voltage compensation value, and then driving a light-emitting diode in the pixel circuit to emit light.

15 Claims, 3 Drawing Sheets

(51) Int. Cl.

| | |
|---|---|
| ***G09G 5/00*** | (2006.01) |
| ***G09G 3/30*** | (2006.01) |
| ***G09G 3/3258*** | (2016.01) |
| ***H05B 33/08*** | (2020.01) |
| ***G09G 3/20*** | (2006.01) |

(52) U.S. Cl.

CPC . *G09G 2310/0264* (2013.01); *H05B 33/0845* (2013.01); *H05B 33/0896* (2013.01)

(56) References Cited

U.S. PATENT DOCUMENTS

| | | | |
|---|---|---|---|
| 2016/0351096 | A1 | 12/2016 | Tani et al. |
| 2017/0169767 | A1 | 6/2017 | Song |

* cited by examiner

METHOD FOR DRIVING A PIXEL CIRCUIT, DRIVE DEVICE AND DISPLAY DEVICE

CROSS-REFERENCE TO RELATED APPLICATION

This Application claims priority to Chinese Patent Application No. 201810002145.3, filed on Jan. 2, 2018, the content of which is incorporated by reference in the entirety.

TECHNICAL FIELD

This disclosure relates to the field of display technologies, and particularly to a method for driving a pixel circuit, a drive device and a display device.

DESCRIPTION OF THE RELATED ART

An Organic Light-Emitting Diode (OLED), a Quantum Dot Light-Emitting Diode (QLED), and other light-emitting diodes have the advantages of self-luminescence, low power consumption, etc., and are one of focuses in the field of researches on applications of an electroluminescent display panel. At present, a light-emitting diode is generally driven by current, and needs to be driven with stable current to emit light. Furthermore the light-emitting diode is driven by a pixel circuit in the electroluminescent display panel. The pixel circuit in the related art as illustrated in FIG. 1 generally includes a drive transistor T1, a switch transistor T2, and a storage capacitor Cst. The pixel circuit is configured to control the switch transistor T2 to be turned on to write data voltage at a data signal terminal Data into a gate of the drive transistor T1, to thereby control the drive transistor T1 to generate operating current so as to drive a light-emitting diode L to emit light. However the drive transistor T1 may age, etc., as its service period of time is growing, so that threshold voltage and mobility of the drive transistor T1 may drift, thus resulting in a difference in display brightness.

SUMMARY

Embodiments of the disclosure provide a method for driving a pixel circuit, a drive device and a display device.

In an aspect, the embodiments of the disclosure provide a method for driving a pixel circuit, the method including: receiving grayscale data to be displayed; determining a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit; and compensating the theoretical drive voltage corresponding to the grayscale data to be displayed with the determined voltage compensation value, and then driving a light-emitting diode in the pixel circuit to emit light.

In some embodiments, in the method above according to the embodiments of the disclosure, the correspondence relationship between theoretical drive voltage corresponding to respective grayscale data, and corresponding voltage compensation values is determined as follows: writing theoretical drive voltage corresponding to respective grayscale data to be displayed to a gate of the drive transistor; writing first preset voltage to a gate of the detection transistor, and writing second preset voltage to a drain of the detection transistor; writing power supply voltage to a drain of the drive transistor; and determining the correspondence relationship between theoretical drive voltage corresponding to respective grayscale data, and corresponding voltage compensation values, under a condition that drive current flowing through the drive transistor is equal to detection current flowing through the detection transistor.

In some embodiments, in the method above according to the embodiments of the disclosure, the correspondence relationship between theoretical drive voltage corresponding to respective grayscale data, and corresponding voltage compensation values is determined by an equation of:

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases}.$$

Wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

In some embodiments, in the method above according to the embodiments of the disclosure, the correspondence relationship between theoretical drive voltage corresponding to respective grayscale data, and corresponding voltage compensation values is determined by an equation of:

$$V_{data} = \sqrt{\frac{k_2}{k_1}V_s(V_s - 2V_{g'})} + V_s.$$

In some embodiments, in the method above according to the embodiments of the disclosure, a difference between the second preset voltage and voltage of a source of the drive transistor is less than on-voltage of the light-emitting diode.

In some embodiments, in the method above according to the embodiments of the disclosure, a value of the second preset voltage is 0V.

In another aspect, the embodiments of the disclosure provide a drive device, including at least one processor and a memory; wherein the memory is configured to store computer readable program codes, the at least one processor is configured to execute the computer readable program codes to: receive grayscale data to be displayed; determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit; compensate the theoretical drive voltage corresponding to the grayscale data to be displayed with the determined voltage compensation value, and then drive a light-emitting diode in the pixel circuit to emit light.

In some embodiments, in the drive device above according to the embodiments of the disclosure, the at least one processor is further configured to execute the computer readable program codes to: write theoretical drive voltage corresponding to respective grayscale data to be displayed to a gate of the drive transistor; write first preset voltage to a gate of the detection transistor, and write second preset voltage to a drain of the detection transistor; write power supply voltage to a drain of the drive transistor; and determine the correspondence relationship between theoretical drive voltage corresponding to respective grayscale data, and corresponding voltage compensation values, under a condition that drive current flowing through the drive transistor is equal to detection current flowing through the detection transistor.

In some embodiments, in the drive device above according to the embodiments of the disclosure, the at least one processor is further configured to execute the computer readable program codes to determine the correspondence relationship between theoretical drive voltage corresponding to respective grayscale data, and corresponding voltage compensation values by an equation of:

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases}.$$

Wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

In some embodiments, in the drive device above according to the embodiments of the disclosure, the at least one processor is further configured to execute the computer readable program codes to determine the correspondence relationship between theoretical drive voltage corresponding to respective grayscale data, and corresponding voltage compensation values by an equation of:

$$V_{data} = \sqrt{\frac{k_2}{k_1}V_s(V_s - 2V_{g'})} + V_s.$$

In some embodiments, in the drive device above according to the embodiments of the disclosure, a difference between the second preset voltage and voltage of a source of the drive transistor is less than on-voltage of the light-emitting diode.

In some embodiments, in the drive device above according to the embodiments of the disclosure, a value of the second preset voltage is 0V.

In still another aspect, the embodiments of the disclosure provide a display device, including a drive device, wherein the drive device includes at least one processor and a memory; wherein the memory is configured to store computer readable program codes, the at least one processor is configured to execute the computer readable program codes to: receive grayscale data to be displayed; determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit; compensate the theoretical drive voltage corresponding to the grayscale data to be displayed with the determined voltage compensation value, and then drive a light-emitting diode in the pixel circuit to emit light.

In some embodiments, in the display device above according to the embodiments of the disclosure, the at least one processor is further configured to execute the computer readable program codes to: write theoretical drive voltage corresponding to respective grayscale data to be displayed to a gate of the drive transistor; write first preset voltage to a gate of the detection transistor, and write second preset voltage to a drain of the detection transistor; write power supply voltage to a drain of the drive transistor; and determine the correspondence relationship between theoretical drive voltage corresponding to respective grayscale data, and corresponding voltage compensation values, under a condition that drive current flowing through the drive transistor is equal to detection current flowing through the detection transistor.

In some embodiments, in the display device above according to the embodiments of the disclosure, the at least one processor is further configured to execute the computer readable program codes to determine the correspondence relationship between theoretical drive voltage corresponding to respective grayscale data, and corresponding voltage compensation values by an equation of:

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases}.$$

Wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

In some embodiments, in the display device above according to the embodiments of the disclosure, the at least one processor is further configured to execute the computer readable program codes to determine the correspondence relationship between theoretical drive voltage corresponding to respective grayscale data, and corresponding voltage compensation values by an equation of:

$$V_{data} = \sqrt{\frac{k_2}{k_1} V_s(V_s - 2V_{g'})} + V_s.$$

In some embodiments, in the display device above according to the embodiments of the disclosure, a difference between the second preset voltage and voltage of a source of the drive transistor is less than on-voltage of the light-emitting diode.

In some embodiments, in the display device above according to the embodiments of the disclosure, a value of the second preset voltage is 0V.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
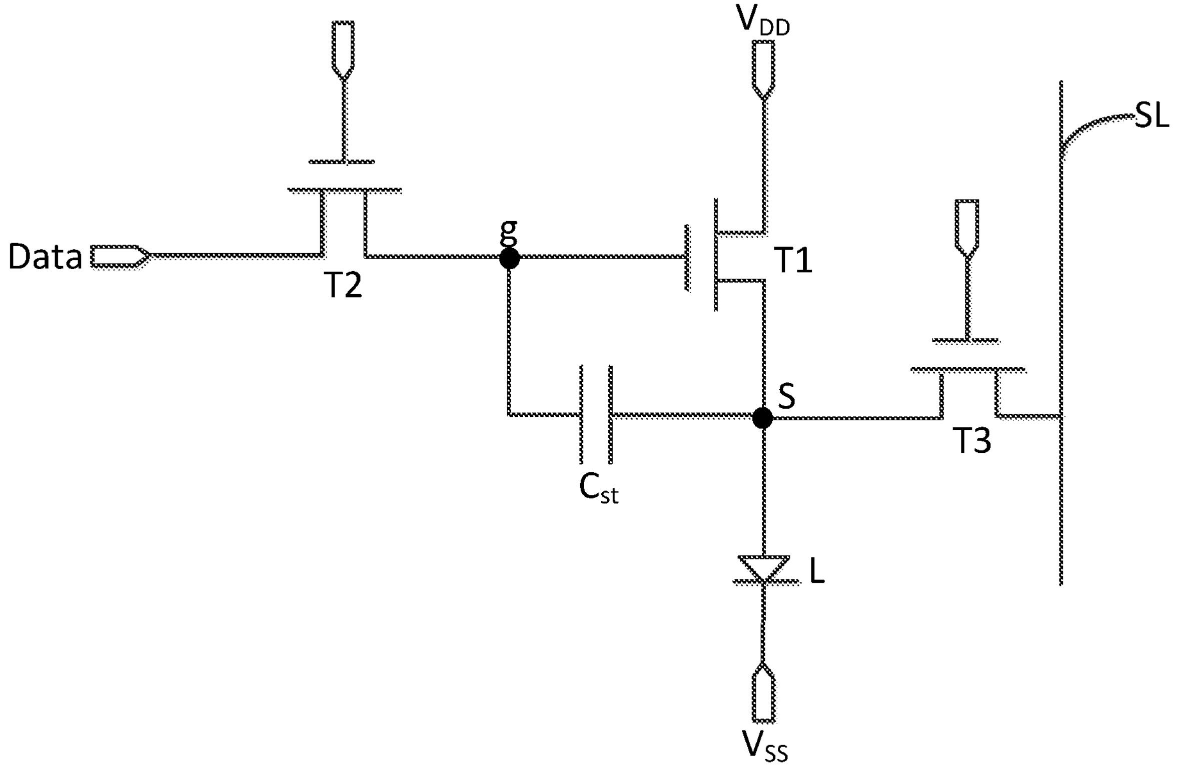
FIG. 1 is a schematic structural diagram of a pixel circuit in the related art.

In the related art, in order to guarantee a display quality, the threshold voltage and the mobility of the drive transistor can be compensated from the outside. As illustrated in FIG. 1, a detection line SL is further arranged in the electroluminescent display panel, and a detection transistor T3 connected with a source of the drive transistor T1 is further arranged in the pixel circuit. Where a row of pixels in the electroluminescent display panel is compensated by controlling a pixel circuit in each sub-pixel in the row to charge the detection line SL, detecting voltage on each detection line SL, and calculating an amount of compensation for the detected voltage to determine data voltage for display corresponding to the respective sub-pixels in the row. However while the detection line SL is being charged, there is such a voltage drop of the transistor T3 that detected voltage of the source of the drive transistor T1 is not theoretical voltage, so the current for driving the light-emitting diode to emit light is not theoretical current, and thus the brightness of the light emitted by the light-emitting diode is not real, thus affecting the effect of displaying an image.

In order to make the objects, technical solutions, and advantages of the disclosure more apparent, implementations of a method for driving a pixel circuit, a drive device and a display device according to the embodiments of the disclosure will be described below in details with reference to the drawings. It shall be noted that the embodiments to be described below are merely intended to illustrate and describe the disclosure, but not to limit the disclosure thereto. Moreover the embodiments of the disclosure, and features in the embodiments can be combined with each other unless they conflict with each other.

Figure 2:
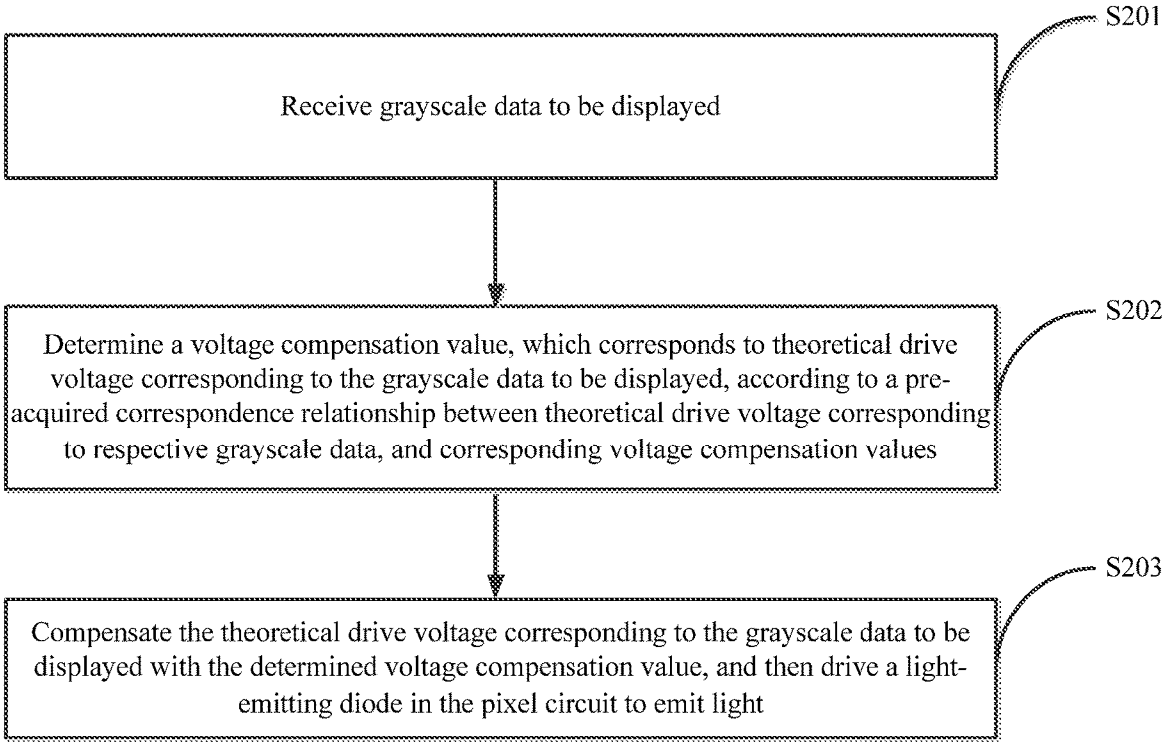
FIG. 2 is a flow chart of a method for driving a pixel circuit according to the embodiments of the disclosure.

A method for driving a pixel circuit according to the embodiments of the disclosure as illustrated in FIG. 2 includes the following operations.

S201 is to receive grayscale data to be displayed.

S202 is to determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit.

S203 is to compensate the theoretical drive voltage corresponding to the grayscale data to be displayed with the determined voltage compensation value, and then drive a light-emitting diode in the pixel circuit to emit light.

In the related art, while grayscale data are being displayed, there is such a voltage drop of the detection transistor that voltage of a source of the drive transistor in the pixel circuit may be raised, so the current for driving the light-emitting diode to emit light does not have a theoretical value, and thus the brightness of the light emitted by the light-emitting diode is not real. And with the method above according to the embodiments of the disclosure, the drive voltage corresponding to the grayscale data to be displayed can be compensated according to the voltage compensation value determined according to the pre-stored correspondence relationship between drive voltage corresponding to respective grayscale data, and corresponding voltage compensation values, where drive voltage corresponding to each piece of grayscale data to be displayed corresponds to a voltage compensation value corresponding to a voltage drop caused by the drive transistor and the detection transistor; and the compensated drive voltage corresponding to the grayscale data is used as the new drive voltage corresponding to the grayscale data to drive the light-emitting diode to emit light, thus eliminating an influence of the voltage drop of the drive transistor and the detection transistor, so the method for driving the pixel circuit according to the embodiments of the disclosure addresses the problem in the related art that there is such a voltage drop of the detection transistor and the drive transistor that the current for driving the light-emitting diode to emit light does not have a theoretical value, and thus the brightness of the light emitted by the light-emitting diode is not real, thus improving the effect of displaying an image.

In some embodiments, in the method above according to the embodiments of the disclosure, the correspondence relationship between theoretical drive voltage corresponding to respective grayscale data, and corresponding voltage compensation values is determined as follows.

Writing theoretical drive voltage corresponding to respective grayscale data to be displayed to a gate of the drive transistor; writing first preset voltage to a gate of the detection transistor, and writing second preset voltage to a drain of the detection transistor; writing power supply voltage to a drain of the drive transistor; and determining the correspondence relationship between theoretical drive voltage corresponding to respective grayscale data, and corresponding voltage compensation values, under a condition that drive current flowing through the drive transistor is equal to detection current flowing through the detection transistor.

In some embodiments, the correspondence relationship between theoretical drive voltage corresponding to respective grayscale data, and corresponding voltage compensation values is determined by a following equation.

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases}.$$

Wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

It shall be noted that, while the pixel circuit is in operation, the drive transistor operates in a saturation region and the switch transistor operates in a linear region, so the current flowing through the drive transistor is defined by the equation of $$I_1 = \frac{1}{2}k_1(V_{gs} - V_{th})^2,$$

and the current flowing through the detection transistor is defined by the equation of $$I_2 = k_2\left[(V_{g's} - V'_{th})V_{ds} - \frac{1}{2}V_{ds}^2\right].$$

In some embodiments, in the method above according to the embodiments of the disclosure, the correspondence relationship between theoretical drive voltage corresponding to respective grayscale data, and corresponding voltage compensation values is determined by an equation of:

$$V_{data} = \sqrt{\frac{k_2}{k_1}V_s(V_s - 2V_{g'})} + V_s,$$

which is derived from $$I_1 = I_2, \text{ i.e., } \frac{1}{2}k_1(Vgs - Vth)^2 = k_2\left[(V_{g's} - V'_{th})V_{ds} - \frac{1}{2}V_{ds}^2\right].$$

In some embodiments, in order to disable the light-emitting diode from emitting light, a difference between the second preset voltage and voltage of a source of the drive transistor is less than on-voltage of the light-emitting diode.

In some embodiments, in order to enable the drive transistor, in the method above according to the embodiments of the disclosure, a value of the second preset voltage is 0V. There is such a voltage-division function of the detection transistor and the drive transistor that the voltage $V_S$ of the source of the drive transistor is raised, so the value of the gate-source voltage of the drive transistor, i.e., $V_{gs}=V_{data}-V_s$, drops, and the drive current deviates; and the second preset voltage is set to 0, so the voltage $V_S$ of the source of the drive transistor is 0 in theory, and thus $V_S$ is calculated as a voltage compensation value. Furthermore in a detection stage, in order to disable the light-emitting diode from emitting light, lower first preset voltage is input to the gate of the drive transistor, and in order to enable the drive transistor, the second preset voltage written to the source of the drive transistor through the detection transistor is generally 0V.

In some embodiments, in the method above according to the embodiments of the disclosure, after the drive voltage corresponding to the grayscale data to be displayed is compensated with the determined voltage compensation value, the light-emitting diode in the pixel circuit is driven to emit light by: using a sum of the determined voltage compensation value, and the drive voltage corresponding to the grayscale data to be displayed as new drive voltage corresponding to the grayscale data to be displayed, and driving the light-emitting diode in the pixel circuit to emit light by the new drive voltage corresponding to the grayscale data to be displayed.

In this way, an influence of a voltage drop of the drive transistor and the detection transistor can be eliminated to thereby addresses the problem in the related art that there is such a voltage drop of the detection transistor and the drive transistor that the current for driving the light-emitting diode to emit light does not have a theoretical value, and thus the brightness of the light emitted by the light-emitting diode is not real, thus improving the effect of displaying an image.

Figure 3:
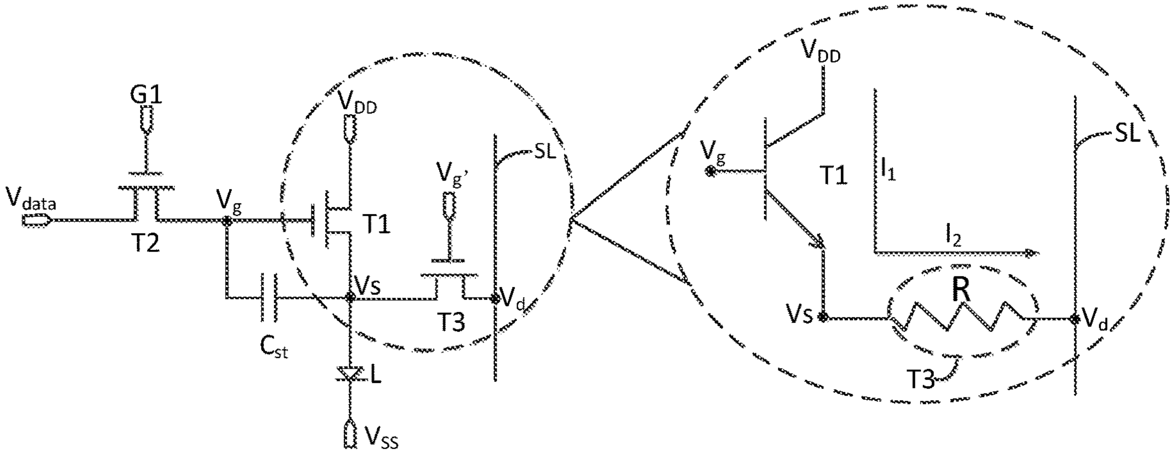
FIG. 3 is a schematic structural diagram of a pixel circuit according to the embodiments of the disclosure.

In some embodiments, as illustrated in FIG. 3, a size of the second switch transistor T2 is generally designed relatively small, so there is a neglectable voltage drop across the second switch transistor T2, and voltage $V_{data}$ written into the second switch transistor T2 is approximately equal to gate voltage $V_g$ of the drive transistor.

The compensation principle of the method above according to the embodiments of the disclosure will be described below in details with reference to FIG. 3.

In some embodiments, a partial equivalent circuitry of a circuitry in the dotted circle on the left is illustrated in the dotted circle on the right as illustrated in FIG. 3, where the detection transistor T3 is equivalent to a resistor R, that is, there is a voltage drop across the detection transistor T3; and in the detection stage, the first preset voltage $V_{g'}$ is input to the gate of the detection transistor T3 to turn on the detection transistor T3, the second preset voltage Vd of 0V is input to the drain of the detection transistor T3 through the detection line SL so that the drive transistor T1 can be turned on, the drive voltage corresponding to the grayscale data to be displayed is written to the gate of the drive transistor T1, and the power supply voltage $V_{DD}$ is input to the drain of the drive transistor T1. The voltage written to the gate of the drive transistor T1 is lower than the on-voltage of the light-emitting diode in this stage, so the light-emitting diode does not emit light, and the current in the pixel circuit flows from the drain of the drive transistor T1 to the detection transistor T3. In this stage, the drive transistor T1 operates in the saturation region, so the current flowing through the drive transistor T1 is $$I_1 = \frac{1}{2}k_1(V_{gs} - V_{th})^2;$$

and the detection transistor T3 operates in the linear region, so the current flowing through the detection transistor T3 is $$I_2 = k_2\left[(V_{g's} - V'_{th})V_{ds} - \frac{1}{2}V_{ds}^2\right].$$

With $I_1=I_2$, that is, $$\frac{1}{2}k_1(Vgs - Vth)^2 = k_2\left[(Vg's - V'_{th})V_{ds} - \frac{1}{2}V_{ds}^2\right],$$

and assuming that $V_{th}=0$, and $V'_{th}=0$ in the embodiments of the disclosure (of course, $V_{th}$ and $V'_{th}$ may alternatively be not 0), when $V_{th}=0$, and $V'_{th}=0$, $$V_{data} = \sqrt{\frac{k_2}{k_1}V_s(V_s - 2V_{g'})} + V_s$$

can be derived, where $V_{g'}$ is the voltage written to the gate of the detection transistor T3 in the pixel circuit, and is a known quantity; thus the correspondence relationship between drive voltage $V_{data}$ corresponding to respective grayscale data to be displayed, and voltage compensation values $V_s$ can be derived from the equation above, so that the voltage compensation values $V_s$ corresponding to the drive voltage $V_{data}$ corresponding to the respective grayscale data to be displayed can be determined according to the correspondence relationship, that is, each piece of grayscale data to be displayed corresponds to a voltage compensation value $V_s$. Where there are grayscale levels 0 to 255 of grayscale data, that is, 256 grayscales correspond to 256 voltage compensation values. The drive voltage $V_{data}$ corresponding to the grayscale data to be displayed is compensated with the voltage compensation value, and the light-emitting diode L is driven by using the compensated drive voltage $V_{data}$ corresponding to the grayscale data as new drive voltage to emit light.

For example, if the original drive voltage corresponding to the grayscale data to be displayed is 5V, and a voltage compensation value 0.5V corresponding thereto can be determined according to the correspondence relationship above, then the original drive voltage 5V corresponding to the grayscale data to be displayed will be compensated with the voltage compensation value 0.5V, so the light-emitting diode L is driven by using 5.5V as new drive voltage corresponding to the grayscale data to emit light to thereby eliminate an influence of a voltage drop across the detection transistor T3. Accordingly the method for driving the pixel circuit according to the embodiments of the disclosure addresses the problem in the related art that there is such a voltage drop of the detection transistor T3 that the current for driving the light-emitting diode L to emit light does not have a theoretical value, and thus the brightness of the light emitted by the light-emitting diode L is not real, thus improving the effect of displaying an image.

Figure 4:
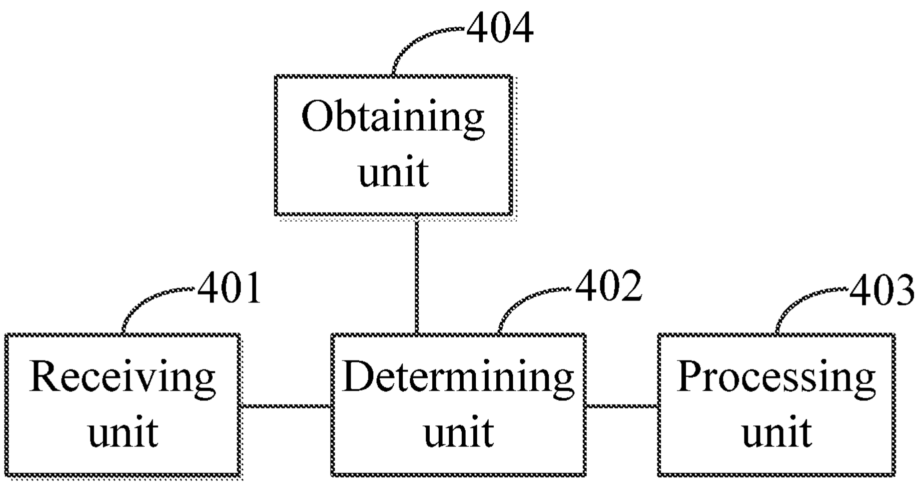
FIG. 4 is a schematic structural diagram of a drive device according to the embodiments of the disclosure.

Based upon the same inventive concept, the embodiments of the disclosure further provide a drive device, and as illustrated in FIG. 4, the drive device includes following components.

A receiving unit 401 is configured to receive grayscale data to be displayed.

A determining unit 402 is configured to determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit.

A processing unit 403 is configured to compensate the theoretical drive voltage corresponding to the grayscale data to be displayed with the determined voltage compensation value, and then drive a light-emitting diode in the pixel circuit to emit light.

An obtaining unit 404 is configured to obtain in advance the correspondence relationship between theoretical drive voltage corresponding to respective grayscale data, and corresponding voltage compensation values.

In some embodiments, in the drive device above according to the embodiments of the disclosure, the obtaining unit 404 is further configured to determine the correspondence relationship between theoretical drive voltage corresponding to respective grayscale data, and corresponding voltage compensation values as follows: write theoretical drive voltage corresponding to respective grayscale data to be displayed to a gate of the drive transistor; write first preset voltage to a gate of the detection transistor, and write second preset voltage to a drain of the detection transistor; write power supply voltage to a drain of the drive transistor; and determine the correspondence relationship between theoretical drive voltage corresponding to respective grayscale data, and corresponding voltage compensation values, under a condition that drive current flowing through the drive transistor is equal to detection current flowing through the detection transistor.

In some embodiments, in the drive device above according to the embodiments of the disclosure, the obtaining unit 404 is further configured to determine the correspondence relationship between theoretical drive voltage corresponding to respective grayscale data, and corresponding voltage compensation values by a following equation.

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases}.$$

Where $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

In some embodiments, in the drive device above according to the embodiments of the disclosure, the obtaining unit 404 is further configured to determine the correspondence relationship between theoretical drive voltage corresponding to respective grayscale data, and corresponding voltage compensation values by an equation of:

$$V_{data} = \sqrt{\frac{k_2}{k_1} V_s (V_s - 2V_{g'})} + V_s,$$

which is derived from $$I_1 = I_2, \text{ i.e., } \frac{1}{2} k_1 (Vgs - Vth)^2 = k_2 \left[ (V_{g's} - V'_{th}) V_{ds} - \frac{1}{2} V_{ds}^2 \right].$$

In some embodiments, in order to disable the light-emitting diode from emitting light, in the drive device above according to the embodiments of the disclosure, a difference between the second preset voltage, and voltage of a source of the drive transistor is less than on-voltage of the light-emitting diode.

In some embodiments, in order to enable the drive transistor, in the drive device above according to the embodiments of the disclosure, a value of the second preset voltage is 0V. There is such a voltage-division function of the detection transistor and the drive transistor that the voltage $V_S$ of the source of the drive transistor is raised, so the value of the gate-source voltage of the drive transistor, i.e., $V_{gs}=V_{data}-V_s$, drops, and the drive current deviates; and the second preset voltage is set to 0, so the voltage $V_S$ of the source of the drive transistor is 0 in theory, and thus $V_S$ is calculated as a voltage compensation value. Furthermore in a detection stage, in order to disable the light-emitting diode from emitting light, lower first preset voltage is input to the gate of the drive transistor, and in order to enable the drive transistor, the second preset voltage written to the source of the drive transistor through the detection transistor is generally 0V.

Figure 5:
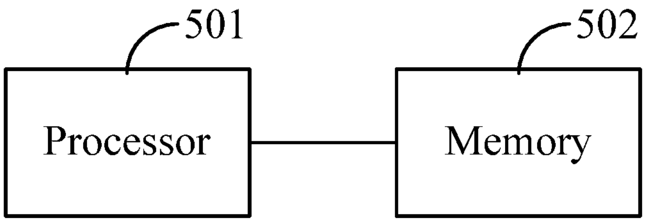
FIG. 5 is a schematic structural diagram of another drive device according to the embodiments of the disclosure.

Based upon the same inventive concept, the embodiments of the disclosure further provide a drive device for driving a pixel circuit, as illustrated in FIG. 5, the drive device includes at least one processor 501 and a memory 502; wherein the memory 502 is configured to store computer readable program codes, the at least one processor 501 is configured to execute the computer readable program codes to: receive grayscale data to be displayed; determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit; compensate the theoretical drive voltage corresponding to the grayscale data to be displayed with the determined voltage compensation value, and then drive a light-emitting diode in the pixel circuit to emit light.

In some embodiments, in the drive device above according to the embodiments of the disclosure, the at least one processor 501 is further configured to execute the computer readable program codes to: write theoretical drive voltage corresponding to respective grayscale data to be displayed to a gate of the drive transistor; write first preset voltage to a gate of the detection transistor, and write second preset voltage to a drain of the detection transistor; write power supply voltage to a drain of the drive transistor; and determine the correspondence relationship between theoretical drive voltage corresponding to respective grayscale data, and corresponding voltage compensation values, under a condition that drive current flowing through the drive transistor is equal to detection current flowing through the detection transistor.

In some embodiments, in the drive device above according to the embodiments of the disclosure, the at least one processor 501 is further configured to execute the computer readable program codes to determine the correspondence relationship between theoretical drive voltage corresponding to respective grayscale data, and corresponding voltage compensation values by an equation of:

$$\begin{cases} I_1 = I_2 \\ I_1 = \frac{1}{2} k_1 (V_{gs} - V_{th})^2 \\ I_2 = k_2 \left[ (V_{g's} - V'_{th}) V_{ds} - \frac{1}{2} V_{ds}^2 \right] \\ V_{gs} = V_g - V_s = V_{data} - V_s \\ V_{g's} = V_{g'} - V_s \\ V_{ds} = V_d - V_s \end{cases}.$$

Where $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

In some embodiments, in the drive device above according to the embodiments of the disclosure, the at least one processor 501 is further configured to execute the computer readable program codes to determine the correspondence relationship between theoretical drive voltage corresponding to respective grayscale data, and corresponding voltage compensation values by an equation of:

$$V_{data} = \sqrt{\frac{k_2}{k_1} V_s (V_s - 2V_{g'})} + V_s.$$

In some embodiments, in the drive device above according to the embodiments of the disclosure, a difference between the second preset voltage and voltage of a source of the drive transistor is less than on-voltage of the light-emitting diode.

In some embodiments, in the drive device above according to the embodiments of the disclosure, a value of the second preset voltage is 0V.

In some embodiments, in the drive device above according to the embodiments of the disclosure, the memory 502 is configured to store the correspondence relationship or a correspondence table between theoretical drive voltage corresponding to respective grayscale data, and corresponding voltage compensation values, e.g. store the correspondence relationship of $$V_{data} = \sqrt{\frac{k_2}{k_1} V_s (V_s - 2V_{g'})} + V_s,$$

or store a function of $$V_{data} = \sqrt{\frac{k_2}{k_1} V_s (V_s - 2V_{g'})} + V_s;$$

where $k_1$ is the structural parameter of the drive transistor, $k_2$ is the structural parameter of the detection transistor, $V_{data}$ is the theoretical drive voltage corresponding to the respective grayscale data to be displayed, $V_{g'}$ is the first preset voltage, and $V_s$ is the voltage compensation value.

In some embodiments, in the drive device above according to the embodiments of the disclosure, the at least one processor 501 includes a receiving unit, a determining unit, a processing unit, and an obtaining unit.

In some embodiments, the receiving unit in the at least one processor 501 receives grayscale data to be displayed; the determining unit determines a voltage compensation value according to a correspondence relationship or a correspondence table between theoretical drive voltage and a voltage compensation value, stored in the memory 502; and the processing unit compensates the theoretical drive voltage with the voltage compensation value, and then drives a light-emitting diode in the pixel circuit to emit light; the obtaining unit obtains in advance the correspondence relationship or the correspondence table between theoretical drive voltage corresponding to respective grayscale data, and corresponding voltage compensation values.

In some embodiments, in the drive device above according to the embodiments of the disclosure, the processor 501 can be a Central Processing Unit (CPU), a Graphic Processing Unit (GPU), a Field Programmable Gate Array (FPGA), or a Digital Signal Processor (DSP), or a Microcontroller Unit (MCU), or another device capable of processing data and/or executing programs, although the embodiments of the disclosure will not be limited thereto.

In some embodiments, in the drive device above according to the embodiments of the disclosure, the memory 502 can include one or more volatile memories and/or nonvolatile memories. For example, the volatile memory can include a Random Access Memory (RAM) and/or a high-speed buffer memory (cache), etc. For example, the nonvolatile memory can include a Read Only Memory (ROM), a hard disk, an Electrically Programmable Read Only Memory (EPROM), a USB memory, a Flash memory, etc. The memory can store one or more operational instructions, one or more applications, or various data, e.g., various data to be used and/or produced by the applications and the operational instructions. Here the memory 502 can be arranged separately, or can be a register, a buffer, etc., in the processor 501, or can be a register in a drive circuit of a display panel, although the embodiments of the disclosure will not be limited thereto.

Based upon the same inventive concept, the embodiments of the disclosure further provide a display device including the drive device above according to any one of the embodiments of the disclosure. Since the display device addresses the problem under a similar principle to the drive device above, reference can be made to the implementation of the drive device above for an implementation of the display device, and a repeated description thereof will be omitted here.

In some embodiments, the display device above according to the embodiments of the disclosure can be a TV set with a large size, or any other large-size display device with a display function. All the other components indispensable to the display device shall readily occur to those ordinarily skilled in the art, so a repeated description thereof will be omitted here, and the embodiments of the disclosure will not be limited thereto.

The embodiments above of the disclosure have been numbered only for the sake of a convenient description but will not suggest any superiority of one embodiment to another.

In the related art, while grayscale data are being displayed, there is such a voltage drop in the detection transistor that voltage of a source of the drive transistor in the pixel circuit may be raised, so the current for driving the light-emitting diode to emit light does not have a theoretical value, and thus the brightness of the light emitted by the light-emitting diode is not real. And with the method above according to the embodiments of the disclosure, the drive voltage corresponding to the grayscale data to be displayed can be compensated with the voltage compensation value determined according to the pre-stored correspondence relationship between drive voltage corresponding to respective grayscale data, and corresponding voltage compensation values, where drive voltage corresponding to each piece of grayscale data to be displayed corresponds to a voltage compensation value corresponding to a voltage drop of the drive transistor and the detection transistor, and the light-emitting diode is driven by using the compensated drive voltage corresponding to the grayscale data as the new drive voltage corresponding to the grayscale data to emit light, thus eliminating an influence of the voltage drop of the drive transistor and the detection transistor, so the method for driving the pixel circuit according to the embodiments of the disclosure addresses the problem in the related art that there is such a voltage drop of the detection transistor and the drive transistor that the current for driving the light-emitting diode to emit light does not have a theoretical value, and thus the brightness of the light emitted by the light-emitting diode is not real, thus improving the effect of displaying an image.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for driving a pixel circuit, the method comprising:

receiving grayscale data to be displayed;

determining a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit; and compensating the theoretical drive voltage corresponding to the grayscale data to be displayed with the determined voltage compensation value, and then driving a light-emitting diode in the pixel circuit to emit light;

wherein the correspondence relationship between theoretical drive voltage corresponding to respective grayscale data, and corresponding voltage compensation values is determined as follows:

writing theoretical drive voltage corresponding to respective grayscale data to be displayed to a gate of the drive transistor;

writing first preset voltage to a gate of the detection transistor, and writing second preset voltage to a drain of the detection transistor;

writing power supply voltage to a drain of the drive transistor; and determining the correspondence relationship between theoretical drive voltage corresponding to respective grayscale data, and corresponding voltage compensation values, under a condition that drive current flowing through the drive transistor is equal to detection current flowing through the detection transistor.

2. The method according to claim 1, wherein the correspondence relationship between theoretical drive voltage corresponding to respective grayscale data, and corresponding voltage compensation values is determined by an equation of:

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases};$$

wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

3. The method according to claim 2, wherein the correspondence relationship between theoretical drive voltage corresponding to respective grayscale data, and corresponding voltage compensation values is determined by an equation of:

$$V_{data} = \sqrt{\frac{k_2}{k_1}V_s(V_s - 2V_{g'})} + V_s.$$

4. The method according to claim 1, wherein a difference between the second preset voltage and voltage of a source of the drive transistor is less than on-voltage of the light-emitting diode.

5. The method according to claim 4, wherein a value of the second preset voltage is 0V.

6. A drive device, comprising at least one processor and a memory;

wherein the memory is configured to store computer readable program codes, the at least one processor is configured to execute the computer readable program codes to:

receive grayscale data to be displayed;

determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit;

compensate the theoretical drive voltage corresponding to the grayscale data to be displayed with the determined voltage compensation value, and then drive a light-emitting diode in the pixel circuit to emit light;

wherein the at least one processor is further configured to execute the computer readable program codes to:

write theoretical drive voltage corresponding to respective grayscale data to be displayed to a gate of the drive transistor;

write first preset voltage to a gate of the detection transistor, and write second preset voltage to a drain of the detection transistor;

write power supply voltage to a drain of the drive transistor; and determine the correspondence relationship between theoretical drive voltage corresponding to respective grayscale data, and corresponding voltage compensation values, under a condition that drive current flowing through the drive transistor is equal to detection current flowing through the detection transistor.

7. The drive device according to claim 6, wherein the at least one processor is further configured to execute the computer readable program codes to determine the correspondence relationship between theoretical drive voltage corresponding to respective grayscale data, and corresponding voltage compensation values by an equation of:

$$\begin{cases} I_1 = I_2 \\ I_1 = \frac{1}{2}k_1(V_{gs} - V_{th})^2 \\ I_2 = k_2\left[(V_{g's} - V'_{th})V_{ds} - \frac{1}{2}V_{ds}^2\right] \\ V_{gs} = V_g - V_s = V_{data} - V_s \\ V_{g's} = V_{g'} - V_s \\ V_{ds} = V_d - V_s \end{cases};$$

wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

8. The drive device according to claim 7, wherein the at least one processor is further configured to execute the computer readable program codes to determine the correspondence relationship between theoretical drive voltage corresponding to respective grayscale data, and corresponding voltage compensation values by an equation of:

$$V_{data} = \sqrt{\frac{k_2}{k_1} V_s (V_s - 2V_{g'})} + V_s.$$

9. The drive device according to claim 6, wherein a difference between the second preset voltage and voltage of a source of the drive transistor is less than on-voltage of the light-emitting diode.

10. The drive device according to claim 9, wherein a value of the second preset voltage is 0V.

11. A display device, comprising a drive device, wherein the drive device comprises at least one processor and a memory; wherein the memory is configured to store computer readable program codes, the at least one processor is configured to execute the computer readable program codes to:

receive grayscale data to be displayed;

determine a voltage compensation value, which corresponds to theoretical drive voltage corresponding to the grayscale data to be displayed, according to a pre-acquired correspondence relationship between theoretical drive voltage corresponding to respective grayscale data, and corresponding voltage compensation values; wherein the voltage compensation value is a voltage drop caused by a detection transistor and a drive transistor in the pixel circuit;

compensate the theoretical drive voltage corresponding to the grayscale data to be displayed with the determined voltage compensation value, and then drive a light-emitting diode in the pixel circuit to emit light;

wherein the at least one processor is further configured to execute the computer readable program codes to:

write theoretical drive voltage corresponding to respective grayscale data to be displayed to a gate of the drive transistor;

write first preset voltage to a gate of the detection transistor, and write second preset voltage to a drain of the detection transistor;

write power supply voltage to a drain of the drive transistor; and determine the correspondence relationship between theoretical drive voltage corresponding to respective grayscale data, and corresponding voltage compensation values, under a condition that drive current flowing through the drive transistor is equal to detection current flowing through the detection transistor.

12. The display device according to claim 11, wherein the at least one processor is further configured to execute the computer readable program codes to determine the correspondence relationship between theoretical drive voltage corresponding to respective grayscale data, and corresponding voltage compensation values by an equation of:

$$\begin{cases} I_1 = I_2 \\ I_1 = \frac{1}{2} k_1 (V_{gs} - V_{th})^2 \\ I_2 = k_2 \left[ (V_{g's} - V'_{th}) V_{ds} - \frac{1}{2} V_{ds}^2 \right]; \\ V_{gs} = V_g - V_s = V_{data} - V_s \\ V_{g's} = V_{g'} - V_s \\ V_{ds} = V_d - V_s \end{cases}$$

wherein $I_1$ is the drive current flowing through the drive transistor, $I_2$ is the detection current flowing through the detection transistor, $k_1$ is a structural parameter of the drive transistor, $k_2$ is a structural parameter of the detection transistor, $V_{data}$ is theoretical drive voltage corresponding to respective grayscale data to be displayed, $V_{g'}$ is the first preset voltage, $V_d$ is the second preset voltage, $V_s$ is voltage compensation value, $V_{th}$ is threshold voltage of the drive transistor, and $V'_{th}$ is threshold voltage of the detection transistor.

13. The display device according to claim 12, wherein the at least one processor is further configured to execute the computer readable program codes to determine the correspondence relationship between theoretical drive voltage corresponding to respective grayscale data, and corresponding voltage compensation values by an equation of:

$$V_{data} = \sqrt{\frac{k_2}{k_1} V_s (V_s - 2V_{g'})} + V_s.$$

14. The display device according to claim 11, wherein a difference between the second preset voltage and voltage of a source of the drive transistor is less than on-voltage of the light-emitting diode.

15. The display device according to claim 14, wherein a value of the second preset voltage is 0V.

* * * * *